US012779761B2

(12) United States Patent
Ikarashi et al.

(10) Patent No.: US 12,779,761 B2
(45) Date of Patent: Nov. 3, 2026

(54) LABELED CONTAINER AND METHOD FOR MANUFACTURING SAME

(71) Applicant: YUPO CORPORATION, Tokyo (JP)

(72) Inventors: Takuya Ikarashi, Ibaraki (JP); Shunsuke Honda, Tokyo (JP); Takeru Yubuchi, Tokyo (JP)

(73) Assignee: YUPO CORPORATION, Tokyo (JP)

( * ) Notice: Subject to any disclaimer, the term of this patent is extended or adjusted under 35 U.S.C. 154(b) by 78 days.

(21) Appl. No.: 18/850,652

(22) PCT Filed: Mar. 23, 2023

(86) PCT No.: PCT/JP2023/011351
§ 371 (c)(1),
(2) Date: Sep. 25, 2024

(87) PCT Pub. No.: WO2023/189983
PCT Pub. Date: Oct. 5, 2023

(65) Prior Publication Data

US 2025/0222643 A1 Jul. 10, 2025

(30) Foreign Application Priority Data

Mar. 30, 2022 (JP) ................................ 2022-057046

(51) Int. Cl.
*B29C 49/24* (2006.01)

(52) U.S. Cl.
CPC .. *B29C 49/2408* (2013.01); *B29C 2049/2414* (2013.01)

(58) Field of Classification Search
CPC ........ B29C 49/2408; B29C 2049/2414; B29C 49/08; B29C 2049/2412; B29C 49/24; B29C 49/78; B29C 63/06
See application file for complete search history.

(56) References Cited

U.S. PATENT DOCUMENTS 4,662,528 A * 5/1987 Slat .................... B65D 23/0864 215/12.2
4,802,295 A * 2/1989 Darr ........................ B29C 49/52 D9/542

(Continued)

FOREIGN PATENT DOCUMENTS

CN 211140039 U 7/2020
CN 215285632 U 12/2021

(Continued)

OTHER PUBLICATIONS

F.Thibault, Automatic Perform Shape Optimization for the Stretch Blow Molding Process, 2005 (Year: 2005).*

(Continued)

*Primary Examiner* — Galen H Hauth
*Assistant Examiner* — Mohamed K Ahmed Ali
(74) *Attorney, Agent, or Firm* — Greenblum & Bernstein, P.L.C.

(57) ABSTRACT

The method for manufacturing a labeled container includes disposing an in-mold label, including the following (a) or (b), heating a preform, inserting the preform into a mold, and blow molding by expanding the preform to form a labeled container. (a) Making the one direction substantially coincide with a horizontal direction when the size of the labeled container with respect to the size of the preform is 2 times or more in a horizontal direction and 1 time or more and 2 times or less in a depth direction. (b) Making the one direction substantially coincide with a perpendicular direction when the size of the labeled container with respect to the size of the preform is 1 time or more and less than 2 times or more in a horizontal direction and 1 time or more and 2 times or less in a depth direction.

9 Claims, 5 Drawing Sheets

(56) References Cited

U.S. PATENT DOCUMENTS

| | | | | |
|---|---|---|---|---|
| 2002/0166833 | A1* | 11/2002 | David Shelby ......... | B29C 49/22 264/516 |
| 2003/0008082 | A1* | 1/2003 | Dronzek, Jr. ........... | B32B 27/08 428/40.1 |
| 2012/0040197 | A1 | 2/2012 | Suzuki et al. | |
| 2015/0136726 | A1 | 5/2015 | Nagaoka et al. | |
| 2020/0001515 | A1 | 1/2020 | Shiokawa et al. | |
| 2022/0176609 | A1 | 6/2022 | Hidaka et al. | |

FOREIGN PATENT DOCUMENTS

| | | | |
|---|---|---|---|
| JP | 2000-127230 | A | 5/2000 |
| JP | 2004-136486 | A | 5/2004 |
| JP | 2014-5080 | A | 1/2014 |
| JP | 2018-60185 | A | 4/2018 |
| JP | 2018-161858 | A | 10/2018 |
| WO | WO 2010/087148 | A1 | 8/2010 |
| WO | WO 2012/085042 | A1 | 6/2012 |
| WO | WO 2020/204178 | A1 | 10/2020 |

OTHER PUBLICATIONS

ISR for PCT/JP2023/011351, dated Jun. 13, 2023 (w/ translation).
Written Opinion for PCT/JP2023/011351, dated Jun. 13, 2023 (w/ translation).
Office Action for TW App. No. 112112202, dated Mar. 2, 2026 (w/ translation).

* cited by examiner

[Fig. 1a]
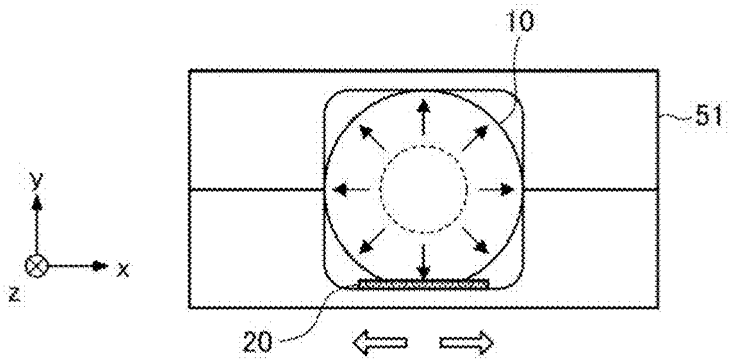
[Fig. 1b]
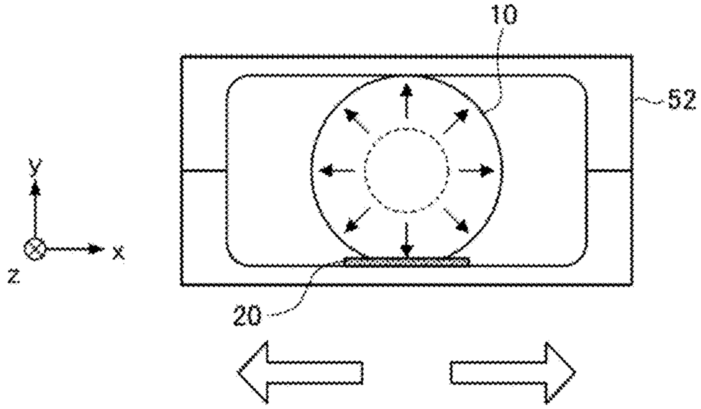

[Fig. 2]
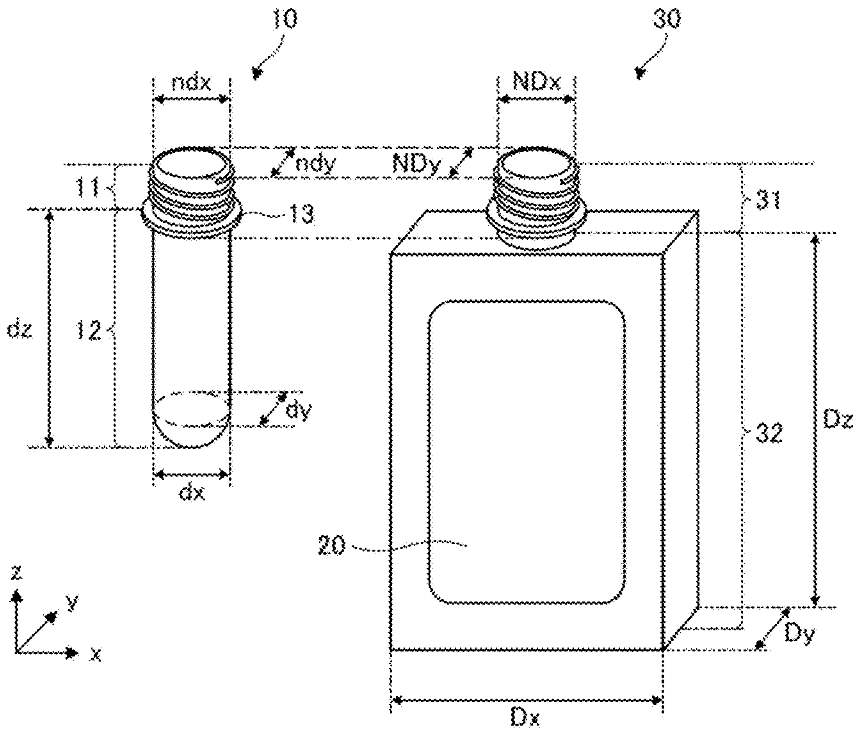

[Fig. 3]
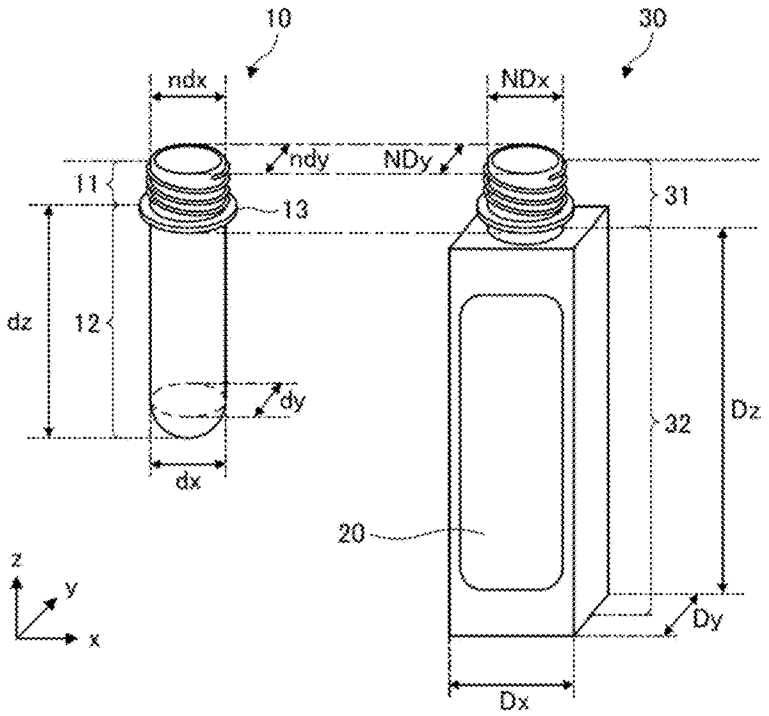

[Fig. 4]
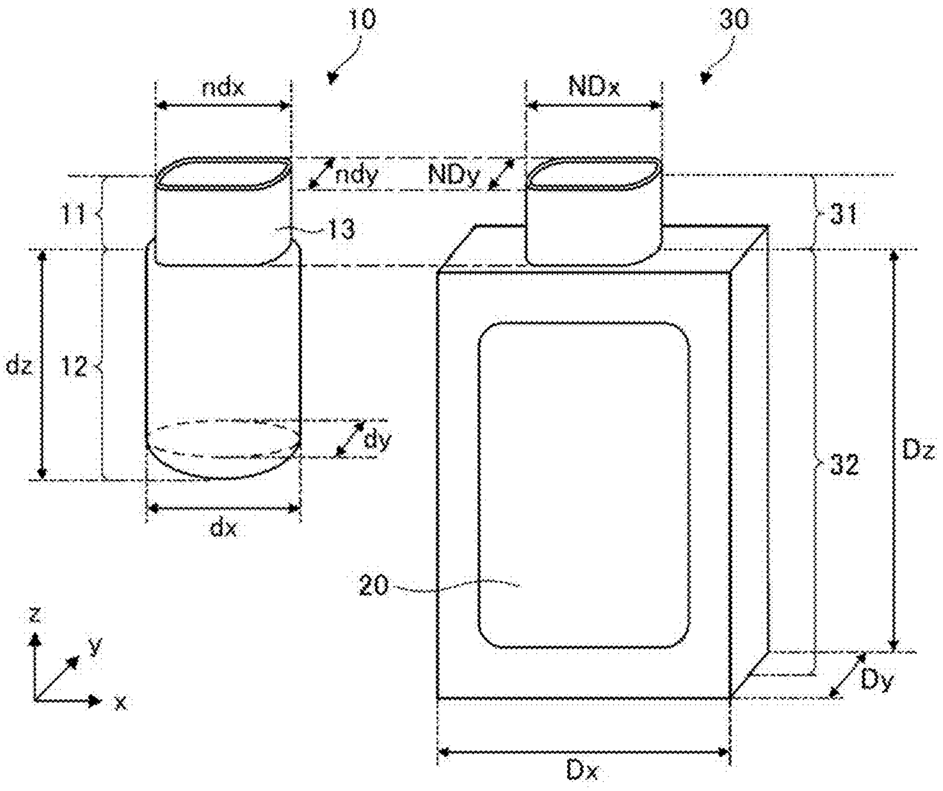

[Fig. 5a]
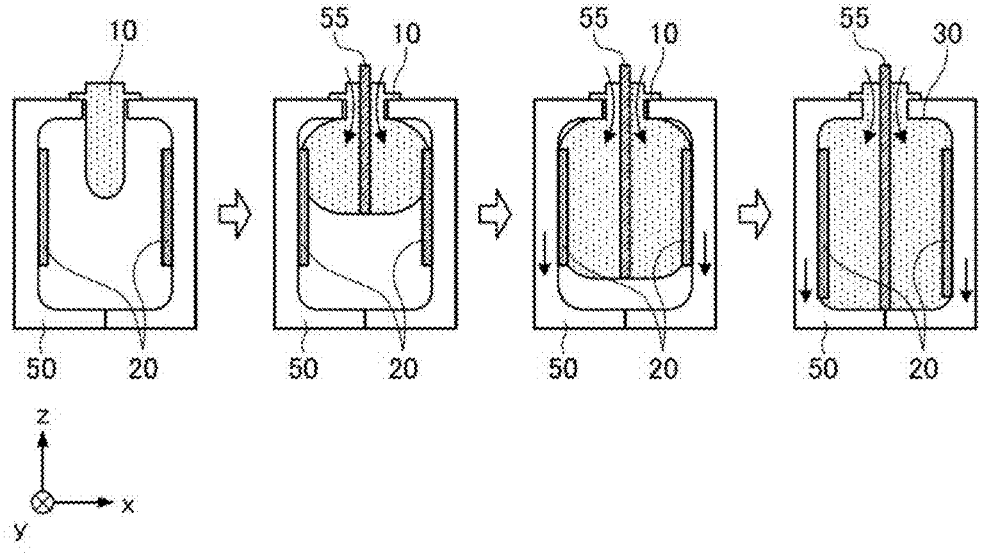
[Fig. 5b]
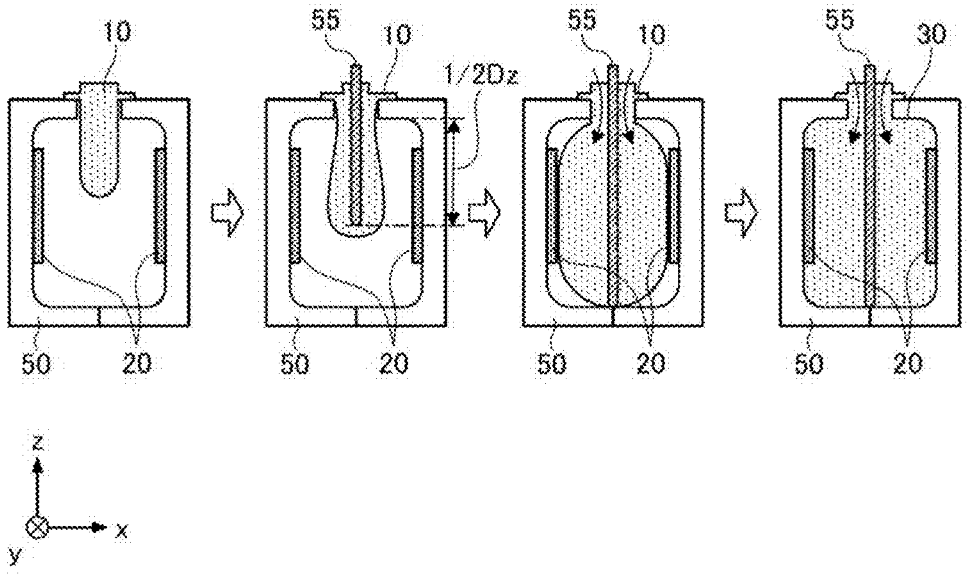

LABELED CONTAINER AND METHOD FOR MANUFACTURING SAME

TECHNICAL FIELD

The present invention relates to a labeled container, and a method for manufacturing the labeled container.

BACKGROUND ART

As a method for forming a hollow resin container, blow molding is known in which in a mold, air is blown into a molten resin, and the molten resin is thus expanded to mold the resin into a shape of the mold. The blow molding includes a extrusion blow method and a stretch blow method. In the extrusion blow method, a parison of raw material resin is used, and the parison is melted by heating it to a temperature equal to or higher than its melting point, and then expanded by applying air pressure.

On the other hand, in the stretch blow method using a preform of raw material resin, the preform is heated to a temperature near its softening point, and then expanded by applying air pressure. In general, the stretch blow method is used when the raw material resin is polyethylene terephthalate or the like.

As a label for a resin container obtained by blow molding, an in-mold label is known. The in-mold label is attached to a surface of the resin container by heat from a raw material resin melted by heating. For example, an in-mold label in which a heat-sensitive adhesive layer containing an ethylene-vinyl acetate copolymer is stacked on a polypropylene film is used for a polyethylene container (see, for example, Patent Literature 1).

An in-mold label including a heat-sealable resin layer containing a polyethylene-based resin on a substrate layer, with the heat-sealable resin layer subjected to surface oxidation treatment to improve adhesiveness to polyethylene terephthalate, has also been proposed (see, for example, Patent Literature 2).

CITATION LIST

Patent Literatures

Patent Literature 1: Japanese Patent Laid-Open No. 2004-136486

Patent Literature 2: Japanese Patent Laid-Open No. 2018-060185

SUMMARY OF INVENTION

Technical Problem

When a container to be formed by a stretch blow method is relatively large with respect to the size of a preform, stress with the preform expanded to extend an in-mold label may be generated in a mold. A printed layer of the in-mold label may also be extended and deformed, resulting in impacts on the appearance, such as obscureness of printed contents and deterioration of the design property.

An object of the present invention is to provide a method for manufacturing a labeled container in which there is little change in appearance of a label even when the container has a relatively large size.

Solution to Problem

The present inventors have extensively conducted studies for solving the above-described problem, and resultantly completed the present invention as below.

[1] A method for manufacturing a labeled container, comprising:

a disposition step of disposing an in-mold label on an inner wall surface of a mold;

a preparation step of preparing a heated preform having an inner hollow;

an insertion step of inserting the preform into the mold; and a blow molding step of blowing a gas into the hollow of the preform, and thus expanding the preform to form a labeled container to which the in-mold label is attached, the in-mold label having a tensile strength of 10 kN/m or more in one direction, the disposition step including the following step (a) or (b) of adjusting an orientation of the in-mold label:

(a) making the one direction of the in-mold label substantially coincide with a horizontal direction when a size of the labeled container is 2 times or more of a size of the preform in the horizontal direction, and the size of the labeled container is 1 time or more and less than 2 times of the size of the preform in a depth direction (b) making the one direction of the in-mold label substantially coincide with a perpendicular direction when the size of the labeled container is 1 time or more and less than 2 times of the size of the preform in the horizontal direction, and the size of the labeled container is 1 time or more and less than 2 times of the size of the preform in the depth direction.

[2] The method for manufacturing a labeled container according to [1], wherein the in-mold label has a tensile strength of 12 kN/m or more in the one direction.

[3] The method for manufacturing a labeled container according to [1] or [2], wherein a temperature of the heated preform is 105° C. or higher.

[4] The method for manufacturing a labeled container according to any one of [1] to [3], wherein a pressure of the gas blown in the blow molding step is 3.5 MPa or less.

[5] The method for manufacturing a labeled container according to any one of [1] to [4], wherein the orientation of the in-mold label is adjusted by the step (b), a rod is inserted into the hollow of the preform in the blow molding step, and the blowing of the gas is started after a length of an inserted portion of the rod exceeds ½ of the size of the labeled container in the perpendicular direction when the preform is stretched in a perpendicular direction by the rod.

[6] The method for manufacturing a labeled container according to any one of [1] to [5], wherein the in-mold label includes a stretched layer.

[7] The method for manufacturing a labeled container according to any one of [1] to [6], wherein the in-mold label has a thickness of 50 to 300 μm.

[8] A labeled container comprising:

a container including a neck portion and a body portion; and an in-mold label attached to an outer surface of the body portion, the in-mold label having a tensile strength of 10 kN/m or more in one direction, the labeled container satisfying the following condition (I) or (II):

(I) a ratio of a size of the body portion to a size of the neck portion is 2 or more in a horizontal direction, a ratio of the size of the body portion to the size of the neck portion is 1 or more and less than 2 in a depth direction, and the one direction of the in-mold label substantially coincides with the horizontal direction (II) the ratio of the size of the body portion to the size of the neck portion is 1 or more and less than 2 in the horizontal direction, the ratio of the size of the body portion to the size of the neck portion is 1 or more and less than 2 in the depth direction, and the one direction of the in-mold label substantially coincides with the perpendicular direction.

Advantageous Effect of Invention

According to the present invention, it is possible to provide a method for manufacturing a labeled container in which there is little change in appearance of a label even when the container has a relatively large size.

BRIEF DESCRIPTION OF DRAWINGS

FIG. 1*a* is a transverse sectional view of a preform expanding in a substantially square-shaped mold, which is seen in a perpendicular direction.

FIG. 1*b* is a transverse sectional view of a preform expanding in a substantially rectangle-shaped mold, which is seen in a perpendicular direction.

FIG. 2 is a perspective view showing a preform which is used for a labeled container of α type and manufacturing thereof.

FIG. 3 is a perspective view showing a preform which is used for a labeled container of β type and manufacturing thereof.

FIG. 4 is a perspective view showing a preform which is used for a labeled container of γ type and manufacturing thereof.

FIG. 5*a* shows a process of expansion of a preform when the time at which blowing of a gas is started is the same as the time at which insertion of a rod is started.

FIG. 5*b* shows process of expansion of a preform when the time at which blowing of a gas is started is adjusted.

DESCRIPTION OF EMBODIMENTS

Hereinafter, labeled containers and methods for manufacturing thereof according to the present invention will be described in detail. Described below are examples (typical examples) of the present invention, which do not limit the present invention.

In the following description, the term "(meth)acryl" indicates both acryl and methacryl.

(Method for Manufacturing Labeled Container)

A method for manufacturing a labeled container according to the present invention includes the following steps:

(S1) a disposition step of disposing an in-mold label on an inner wall surface of a mold;

(S2) a preparation step of preparing a heated preform having an inner hollow;

(S3) an insertion step of inserting the heated preform into the mold; and (S4) a blow molding step of blowing a gas into the hollow of the preform, and thus expanding the preform to form a labeled container to which the in-mold label is attached.

Hereinafter, the steps will be described.

<Disposition Step>

In the disposition step (S1), an in-mold label is inserted into a mold for formation of a container, and disposed on an inner wall surface of the mold. The in-mold label may be brought into close contact with the inner wall surface by suction, static electricity or the like to hold the in-mold label in place.

In the blow molding step (S4), stress with the preform expanded to extend the in-mold label may be generated. If major stress acts in one direction, the appearance of a label of a labeled container may significantly change, for example, the balance of the aspect ratio of the label is lost, leading to distortion of printed contents. Stress that changes the appearance of the label can be generated by a difference in size between a preform and a container formed therefrom.

FIGS. 1*a* and 1*b* are sectional views of a preform 10 expanding in molds 51 and 52, which is seen in a perpendicular direction z. The preform 10 before expansion is indicated by a dotted line. A horizontal direction x, a depth direction y and the perpendicular direction z orthogonally cross one another.

As shown in FIG. 1*a*, the expanded preform 10 is pressed against an inner wall surface of the mold 51, and molded into a shape identical to an internal shape of the mold 51. An in-mold label (hereinafter, sometimes referred to simply as a label) 20 is disposed on the inner wall surface of the mold 51. The label 20 comes into contact with the preform 10 pressed against the inner wall surface, and is bonded to an outer surface of the preform 10 by heat from the preform 10. Thereafter, stress with the preform 10 further expanded to extend the label 20 is generated. The arrow in the figure indicates a direction in which stress acts.

By the mold 51 in FIG. 1*a*, a container is formed in which sizes in the horizontal direction x and in the depth direction y are substantially the same, so that the container has a square-shaped cross-section. On the other hand, when a flat container having a rectangle-shaped cross-section long in the horizontal direction x is formed using the mold 52 shown in FIG. 1*b*, the preform 10 expands in the horizontal direction x to a larger extent as compared to the case of a square shape. Thus, stress with the label 20 extended in the horizontal direction x is larger than that when the mold 51 is used, and distortion is likely to occur in the appearance of the label.

In the extrusion blow method, a parison as a raw material resin is sufficiently melted at a high temperature, so that the expanded parison is flexible, and easily follows the shape of a mold, and stress applied to the label is relatively small. On the other hand, in the stretch blow method, a raw material resin melted at a high temperature as in the case of the parison is not used, but the raw material resin is used as a perform. The preform is held at a relatively a low temperature, and remains in a softened state. A blow pressure higher than that in the extrusion blow method is also required because the preform having a higher viscosity over the parison is expanded. As a result, the appearance of the label tends to more easily change with larger stress applied to the label in the stretch blow method than in the extrusion blow method.

As shown in FIGS. 2 to 4, the labeled container 30 in which there can be a change in appearance of the label is classified roughly into three types, i.e., α, β and γ types, according to a size difference from the preform 10. The preform 10 and the labeled container 30 are disposed such that the longitudinal direction of the bottom surface coincides with the horizontal direction x, and the in-mold label 20 is disposed on a plane formed by the horizontal direction x and the perpendicular direction z of the labeled container 30.

As shown in FIGS. 2 to 4, the preform 10 has an inner hollow, and is typically a bottomed cylinder-shaped molded product. The preform 10 includes a neck portion 11, a body portion 12 and a fringe 13. The labeled container 30 includes a neck portion 31, a body portion 32, and an in-mold label 20 attached to an outer surface of the body portion 32.

The preform 10 is fixed in the mold by inserting the body portion 12 into the mold, followed by engagement of the fringe 13 with a peripheral edge portion of an opening of the mold. In the blow molding step (S4), the body portion 12 located in the mold and below the fringe 13 expands, and is stretched to form the body portion 32 of the labeled container 30. The neck portion 11 of the preform 10 is not stretched in the blow molding step (S4), and therefore the sizes of the neck portion 31 of the labeled container 30 and the neck portion 11 of the preform 10 are not different and are almost the same. On the outer periphery of the neck portions 11 and 31, a helical groove can be provided along a circumferential direction, so that integration with a cap having a similar structure can be performed.

<<α Type>>

As shown in FIG. 2, the labeled container 30 of a type has a flat-shaped cross-section, where a size in the horizontal direction x, Dx is larger than a size in the depth direction y, Dy. For the α type, the term "flat shape" means that for example, a ratio of the size in the horizontal direction x, Dx to the size in the depth direction y, Dy (oblateness Dx/Dy) in the body portion 32 is 1.6 or more. The oblateness Dx/Dy can be, for example, 5.0 or less.

In the α type, the preform 10 in which a size in the horizontal direction x, dx and a size in the depth direction y, dy in the body portion 12 are substantially the same is used in manufacturing of the labeled container 30. Thus, the labeled container 30 from stretch blow molding has a high draw ratio in the horizontal direction x (Dx/dx), and a low draw ratio in the depth direction y (Dy/dy).

Specifically, in the labeled container 30 of α type, the size in the horizontal direction x, Dx and the size in the depth direction y, Dy in the body portion 32 satisfy the following relationships, respectively, with the size in the horizontal direction x, dx and the size in the depth direction y, dy in the body portion 12 of the preform 10. In this case, the label 20 attached to a surface parallel to the horizontal direction x tends to be extended in the horizontal direction x.

$$2 \leq Dx/dx$$

$$1 \leq Dy/dy < 2$$

The tendency is particularly likely to occur when there is a difference between the draw ratios in the horizontal direction x and depth direction y. Specifically, (Dx×dy)/(Dy×dx), where Dx is a size in the horizontal direction x and Dy is a size in the depth direction y in the body portion 32 and dx is a size in the horizontal direction x and dy is a size in the depth direction y in the body portion 12 of the preform 10, is 2.0 or more, 2.5 or more, or 3.0 or more. (Dx×dy)/(Dy×dx) can be, for example, 5.0 or less.

Similarly, the tendency is likely to occur when the draw ratio in the perpendicular direction z (Dz/dz) is low. The phrase "the draw ratio is low" specifically means that the size dz of the body portion 12 of the preform 10 and the size Dz of the body portion 32 of the labeled container 30 in the perpendicular direction z satisfy the following relationship.

$$1 \leq Dz/dz < 1.5$$

As described above, the neck portion 11 of the preform 10 undergoes little change through blow molding, and the sizes of the neck portions 11 and 31 are substantially the same (ndx≈NDx, ndy≈NDy). Thus, it can also be said that for the α type, the size in the horizontal direction x, Dx and the size in the depth direction y, Dy in the body portion 32 satisfy the following relationships with the size in the horizontal direction x, NDx and the size in the depth direction y, NDy in the neck portion 31.

$$2 \leq Dx/NDx$$

$$1 \leq Dy/NDy < 2$$

<<β Type>>

As shown in FIG. 3, the labeled container 30 of β type has a substantially square-shaped cross-section, where the difference between the size in the depth direction y, Dy and the size in the horizontal direction x, Dx is small. The term "substantially square-shaped" means that for example, a ratio of the size in the horizontal direction x, Dx to the size in the depth direction y, Dy (oblateness Dx/Dy) in the body portion 32 is less than 1.6. The oblateness Dx/Dy can be, for example, 1.0 or more.

For manufacturing of the labeled container 30 of β type, the preform 10 in which the size in the horizontal direction x, dx and the size in the depth direction y, dy in the body portion 12 are substantially the same is used as in the case of the α type. Thus, the labeled container 30 has a relatively low blow molding draw ratio in both horizontal direction x and depth direction y.

Specifically, in the labeled container 30 of β type, the size in the horizontal direction x, Dx and the size in the depth direction y, Dy in the body portion 32 satisfy the following relationships, respectively, with the size in the horizontal direction x, dx and the size in the depth direction y, dy in the body portion 12 of the preform 10. In this case, the label 20 attached to a surface parallel to the horizontal direction x tends to be extended in the perpendicular direction z.

$$1 \leq Dx/dx < 2$$

$$1 \leq Dy/dy < 2$$

The tendency is particularly likely to occur when the draw ratios in the horizontal direction x and depth direction y are close to each other. Specifically, (Dx×dy)/(Dy×dx), where Dx is a size in the horizontal direction x and Dy is a size in the depth direction y in the body portion 32 and dx is a size in the horizontal direction x and dy is a size in the depth direction y in the body portion 12 of the preform 10, is less than 2.0, less than 1.7 or less than 1.4. (Dx×dy)/(Dy×dx) can be, for example, 1.0 or more.

Similarly, the tendency is likely to occur when the draw ratio in the perpendicular direction z is high. The phrase "the draw ratio is high" specifically means that the size dz of the body portion 12 of the preform 10 and the size Dz of the body portion 32 of the labeled container 30 in the perpendicular direction z satisfy the following relationship.

$$1.5 \leq Dz/dz$$

Even for the β type, the sizes of the neck portions 11 and 31 are substantially the same (ndx≈NDx, ndy≈NDy). Thus, it can also be said that for the β type, the size in the horizontal direction x, Dx and the size in the depth direction y, Dy in the body portion 32 satisfy the following relationships with the size in the horizontal direction x, NDx and the size in the depth direction y, NDy in the neck portion 31.

$$1 \le Dx/NDx < 2$$

$$1 \le Dy/NDy < 2$$

<<γ Type>>

As shown in FIG. 4, the labeled container 30 of γ type has a flat shape similar to that of α type, and the preform 10 also has a flat shape, where in the body portion 12, the size in the horizontal direction x, dx is larger than the size in the depth direction y, dy. Similarly, in the neck portion 11, the size ndy is larger than the size ndx. Thus, the γ type is similar to the α type in the shape of the labeled container 30, and similar to the β type in that the blow molding draw ratio in the horizontal direction x and the depth direction y is low. The term "flat shape" means that for example, a ratio of the size in the horizontal direction x, Dx to the size in the depth direction y, Dy (oblateness Dx/Dy) in the body portion 32 is 1.6 or more. The oblateness Dx/Dy can be, for example, 5.0 or less.

For the γ type, in the body portion 32 of the labeled container 30, the size in the horizontal direction x, Dx and the size in the depth direction y, Dy satisfy the following relationships, respectively, with the size in the horizontal direction x, dx and the size in the depth direction y, dy in the body portion 12 of the preform 10. In this case, the label 20 attached to a surface parallel to the horizontal direction x tends to be extended in the perpendicular direction z as in the case of the β type.

$$1 \le Dx/dx < 2$$

$$1 \le Dy/dy < 2$$

The tendency is particularly likely to occur when the draw ratios in the horizontal direction x and the depth direction y are close to each other. Specifically, (Dx×dy)/(Dy×dx), where Dx is a size in the horizontal direction x and Dy is a size in the depth direction y in the body portion 32 and dx is a size in the horizontal direction x and dy is a size in the depth direction y in the body portion 12 of the preform 10, is less than 2.0, less than 1.8 or less than 1.6. (Dx×dy)/(Dy×dx) can be, for example, 1.0 or more.

Similarly, the tendency is likely to occur when the draw ratio in the perpendicular direction z is high. The phrase "the draw ratio is high" means that the size dz of the body portion 12 of the preform 10 and the size Dz of the body portion 32 of the labeled container 30 in the perpendicular direction z satisfy the following relationship.

$$1.5 \le Dz/dz$$

Even for the γ type, the sizes of the neck portions 11 and 31 are substantially the same (ndx≈NDx, ndy≈NDy). Thus, for the γ type, the size in the horizontal direction x, Dx and the size in the depth direction y, Dy in the body portion 32 satisfy the following relationships with the size in the horizontal direction x, NDx and the size in the depth direction y, NDy in the neck portion 31.

$$1 \le Dx/NDx < 2$$

$$1 \le Dy/NDy < 2$$

In the present invention, an in-mold label having a tensile strength of 10 kN/m or more in one direction is used, and the one direction in which the in-mold label has a high tensile strength is made to coincide with a direction in which stress acts in each of a to γ types. This ensures that the label is hardly extended in a direction in which stress acts, and deformation of the label can be reduced.

Specifically, in the manufacturing method of the present invention, the step of disposing an in-mold label (S1) includes the following step (a) or (b) of adjusting an orientation of the in-mold label:

(a) making one direction, in which the in-mold label has a tensile strength of 10 kN/m or more, substantially coincide with the horizontal direction (x) when the size of the labeled container (Dx) is 2 times or more of the size of the preform (dx) in the horizontal direction (x), and the size of the labeled container (Dy) is 1 time or more and less than 2 times of the size of the preform (dy) in the depth direction (y)

(b) making one direction, in which the in-mold label has a tensile strength of 10 kN/m or more, substantially coincide with the perpendicular direction (z) when the size of the labeled container (Dx) is 1 time or more and less than 2 times of the size of the preform (dx) in the horizontal direction (x), and the size of the labeled container (Dy) is 1 time or more and less than 2 times of the size of the preform (dy) in the depth direction (y).

In the present specification, the term "substantially coincide" means that for example, the angle formed by one direction of the in-mold label and the horizontal direction x or the perpendicular direction z is in the range of 0 to 5°, in the range of 0 to 10°, in the range of 0 to 15°, or in the range of 0 to 30°.

For the α type described above, the condition of the step (a) is satisfied, and therefore the orientation of the in-mold label is adjusted by step (a). In the α type, stress acts in the horizontal direction x, but by step (a), a change in appearance of the label can be reduced because the in-mold label resists the stress and is hardly extended in the horizontal direction x.

On the other hand, for β and γ types, the condition of step (b) is satisfied, the orientation of the in-mold label is adjusted by step (b). In β and γ types, stress acts in the perpendicular direction z, but by step (b), a change in appearance of the label can be reduced because the in-mold label resists the stress and is hardly extended in the perpendicular direction z.

<Preparation Step>

In preparation step (S2), a heated preform is prepared by forming a preform from a raw material resin melted by heating. Alternatively, a preform formed in advance and stored at room temperature is heated with a heating device such as a heater. The heated preform softens, and is expanded by pressure of a gas added to a hollow inside the preform in blow molding step (S4). In general, the preform is heated to a temperature near a softening point, which does not exceed the melting point of the raw material resin of the preform. For example, the temperature of the heated preform is preferably 90° C. or higher from the viewpoint of sufficiently softening the preform.

In particular, the temperature of the heated preform is preferably 95° C. or higher, more preferably 100° C. or higher, and further more preferably 105° C. or higher. When the temperature of the preform is 105° C. or higher, the preform is soft, and easily extends. Stress applied to the label during expansion of the preform can be reduced, and a change in appearance of the label can be further reduced. The temperature of the heated preform is preferably 120° C. or lower, and more preferably 110° C. or lower from the viewpoint of stable moldability of the container.

<Insertion Step>

In insertion step (S3), the heated preform is inserted into a mold. The preform has a body portion disposed inside the mold and a neck portion located outside the mold.

<Blow Molding Step>

In blow molding step (S4), a gas is blown into the hollow of the preform, and the pressure thereof (hereinafter, sometimes referred to a blow pressure) expands the preform. In blow molding step (S4), a rod may be used for stretching in a perpendicular direction. When a rod is used, the rod is inserted in the perpendicular direction into the hollow of the preform. The bottom of the preform is pressed by the rod, and the body portion of the preform is stretched downward in the perpendicular direction.

The stress applied to the label by expansion of the preform tends to increase as the blow pressure becomes larger. Thus, from the viewpoint of reducing the stress applied to the label, the blow pressure in the blow molding step is preferably 3.5 MPa or less, more preferably 3.0 MPa or less, further more preferably 2.7 MPa or less, and particularly preferably 2.3 MPa or less. From the viewpoint of moldability, the blow pressure is typically 0.5 MPa or more, and preferably 1.0 MPa or more.

The blow time during which the gas is blown can be set according to molding conditions such as the temperature of the preform and the blow pressure. When the blow pressure is 4.0 MPa or less as described above, the blow time is preferably 3 seconds or more, and more preferably 5 seconds or more from the viewpoint of sufficient expansion, and preferably 10 seconds or less, and more preferably 8 seconds or less from the viewpoint of reducing the stress applied to the label.

When the orientation of the in-mold label is adjusted by the step (b) in disposition step (S1), and the preform is stretched by the rod in blow molding step (S4), it is preferable that the time at which blowing of the gas is started in blow molding step (S4) be adjusted to a rod insertion position. Specifically, blowing of the gas is started after the length of the inserted portion of the rod exceeds preferably ½, and more preferably ¾ of the size of the labeled container in the perpendicular direction. This enables reduction of stress applied in the perpendicular direction to the label by expansion of the preform.

If for the preform 10 installed in the mold 50, blowing of the gas is started in parallel to the start of stretching by the rod 55, the preform 10 expands on the upper side in the perpendicular direction z, and comes into contact with the label 20 disposed on the inner wall surface of the mold 50, as shown in FIG. 5*a*. Even after the preform 10 comes into contact with the label 20, stress of extension in the perpendicular direction z is generated on the label 20 from the preform 10 pushed out downward in the perpendicular direction z by the rod 55 and blowing of the gas.

On the other hand, when the time at which blowing of the gas is started is preceded by the start of stretching by the rod 55, stretching of the preform 10 by the rod 55 can proceed before the preform 10 and the label 20 comes into contact with each other on the upper side in the perpendicular direction z, as shown in FIG. 5*b*. Thus, extension of the label 20 by expansion of the preform 10 is unlikely to occur. When blowing of the gas is started after the length of the inserted portion of the rod 55 exceeds ½ of the size in the perpendicular direction z, Dz in the labeled container 30 to be formed, the preform 10 expands and comes into contact with the whole surface of the label 20 at a time, so that stress applied to the label 20 from the preform can be reduced.

(Labeled Container)

A labeled container of the present invention is manufactured by the manufacturing method described above. As shown in FIGS. 2 to 4, the labeled container of the present invention includes a neck portion, a body portion, and an in-mold label attached to an outer surface of the body portion. The in-mold label has a tensile strength of 10 kN/m or more in one direction, and is subjected to adjustment of its orientation in the step (a) or (b).

As described above, the neck portion of the labeled container is not stretched in the blow molding step, and is identical in size to the neck portion of the preform. Thus, the labeled container of the present invention satisfies the following condition (I) or (II).

(I) a ratio of a size of the body portion (Dx) to a size of the neck portion (NDx) (Dx/NDx) is 2 or more in the horizontal direction (x), a ratio of the size of the body portion (Dy) to the size of the neck portion (NDy) (Dy/NDy) is 1 or more and less than 2 in the depth direction (y), and one direction in which the in-mold label has a tensile strength of 10 kN/m or more substantially coincides with the horizontal direction (x)

(II) the ratio of the size of the body portion (Dx) to the size of the neck portion (NDx) (Dx/NDx) is 1 or more and less than 2 in the horizontal direction (x), the ratio of the size of the body portion (Dy) to the size of the neck portion (NDy) (Dy/NDy) is 1 or more and less than 2 in the depth direction (y), and one direction of the in-mold label has a tensile strength of 10 kN/m or more substantially coincides with the perpendicular direction (z).

<In-Mold Label>

An in-mold label for use in the present invention is only required to have a tensile strength of 10 kN/m or more in at least one direction, and may have a tensile strength of 10 kN/m or more in a plurality of directions. In this case, it is only required that one of a plurality of directions coincide with the horizontal direction x in the step (a), or coincide with the perpendicular direction z in the step (b). From the viewpoint of reducing deformation of the appearance of the label, it is preferable that among a plurality of directions, one direction in which the largest tensile strength is exhibited coincide with the horizontal direction x in the step (a), or coincide with the perpendicular direction z in the step (b).

From the viewpoint of further reducing deformation of the appearance of the label, the tensile strength of the in-mold label is preferably 12 kN/m or more, more preferably 15 kN/m or more, and further more preferably 18 kN/m or more. From the viewpoint of following the shrinkage of the container after molding to obtain an excellent appearance, the tensile strength of the in-mold label is preferably 40 kN/m or less, more preferably 35 kN/m or less, and further more preferably 30 kN/m or less. From the viewpoint of the stability of manufacturing and quality, the tensile strength of the stretched layer in a direction perpendicular to the one direction (in particular, a machine direction (MD)) may be less than 10 kN/m. From the same viewpoint, the tensile strength in a perpendicular direction with respect to the above-described one direction may be 8 kN/m or less, or 6 kN/m or less.

The in-mold label is typically a laminate including a heat sealing layer on a substrate layer. On a surface of the substrate layer on a side opposite to the heat sealing layer, a printed layer composed of an ink composition can be formed by printing. The in-mold label can include a coating layer on the substrate layer from the viewpoint of improving adhesion to the ink.

<<Substrate Layer>>

The substrate layer is not limited as long as it can impart tensile strength to the label. For example, a thermoplastic resin film, wood pulp paper or the like can be used as the substrate layer, and a thermoplastic resin film is preferable from the viewpoint of water resistance and the like. From the viewpoint of obtaining a white label, the substrate layer may be a porous film containing a thermoplastic resin and a filler.

From the viewpoint of controlling the tensile strength to fall within a specific range, the thickness of the substrate layer is preferably 30 μm or more, more preferably 50 μm or more, further more preferably 70 μm or more. From the same viewpoint, the thickness of the substrate layer is preferably 250 μm or less, more preferably 150 μm or less, further more preferably 120 μm or less.

Examples of the thermoplastic resin that can be used for the substrate layer include a polyolefin-based resin, a polyester-based resin, a polyvinyl chloride resin, a polyamide-based resin, a polystyrene resin, and a polycarbonate resin, and one of these resins can be used. From the viewpoint of mechanical strength, a polyolefin-based resin or a polyester-based resin is preferable, and a polyolefin-based resin is more preferable.

Examples of the polyolefin-based resin that can be used for the substrate layer include a polypropylene resin, and a polyethylene resin. Among them, a polypropylene resin is preferable from the viewpoint of easily obtaining desired tensile strength at a stretch blow molding temperature, and the viewpoint of moldability and mechanical strength.

Examples of the filler that can be used for the substrate layer include particles of an inorganic substance such as heavy calcium carbonate, light calcium carbonate, baked clay, silica, talc or titanium oxide, and particles of an organic substance such as polyethylene terephthalate, polyamide, polystyrene or a melamine resin.

Examples of the method for forming a film for the substrate layer include extrusion molding (cast molding) with a T-die, inflation molding with an O-die, and calender molding with a rolling mill roll. The film may be stretched if necessary. A large number of fine pores with a filler as an origination point are formed in the film by stretching, so that a porous film can be obtained. Examples of the stretching method include a longitudinal stretching method using a difference in circumferential velocity between rolls, a lateral stretching method using a tenter oven, a sequential biaxial stretching method using a combination thereof, a rolling method, a simultaneous biaxial stretching method using a combination of a tenter oven and a pantograph, and a simultaneous biaxial stretching method using a combination of a tenter oven and a linear motor.

<<Heat Sealing Layer>>

A heat sealing layer is melted by heat from a preform, and bonded to a resin container. In a mold, an in-mold label is disposed such that a surface on the heat sealing layer side faces the preform.

A thermoplastic resin film can be used as the heat sealing layer. For the heat sealing layer, a thermoplastic resin having a melting point lower than that of a thermoplastic resin in a substrate layer can be used, and the melting point of the relevant thermoplastic resin is preferably lower by 10° C. or more, more preferably lower by 20° C. or more, and further more preferably lower by 30° C. or more than the thermoplastic resin in the substrate layer.

Examples of the thermoplastic resin suitable for the heat sealing layer include a resin such as high-density polyethylene, medium-density polyethylene, low-density polyethylene, linear low-density polyethylene, an ethylene-vinyl acetate copolymer, an ethylene/(meth)acrylic acid copolymer, an ethylene/(meth)acrylic acid alkyl ester copolymer (the number of carbon atoms in the alkyl group is 1 to 8), and a metal salt of an ethylene/(meth)acrylic acid copolymer with a metal (for example, a metal selected from Zn, Al, Li, K and Na).

As a method for forming the heat sealing layer, a known method can be used, and it is preferable to form the heat sealing layer by applying a coating liquid. Examples of the solvent that is used for the coating liquid include water; a water-soluble solvent such as methyl alcohol, ethyl alcohol, isopropyl alcohol, acetone and methyl ethyl ketone; and a water-insoluble solvent such as ethyl acetate, toluene and xylene, from the viewpoint of easy process control.

The coating liquid is preferably in the form of a solution or dispersion obtained by homogeneously dissolving or dispersing a thermoplastic resin in the solvent. From the viewpoint of process control, it is preferable to prepare a coating liquid by mixing an aqueous solution or aqueous dispersion of the components.

The solid content concentration in the coating liquid is preferably 0.1 mass % or more, and more preferably 0.2 mass % or more, from the viewpoint of reducing the drying load. From the viewpoint of obtaining a uniform coating surface, the solid content concentration is preferably 20 mass % or less, and more preferably 10 mass % or less.

From the viewpoint of facilitating adjustment to desired tensile strength, the in-mold label preferably includes stretched layer stretched in at least a uniaxial direction, and more preferably includes a biaxially stretched layer. The substrate layer that makes up a large proportion of the thickness is preferably the stretched layer, and the heat sealing layer may also be the stretched layer. The draw ratio of the stretched layer in one direction is preferably 3 or more, more preferably 4 or more, further more preferably 5 or more, and particularly preferably 6 or more. The draw ratio of the stretched layer may be, for example, 20 or less from the viewpoint of moldability. The draw ratio of the stretched layer in a direction perpendicular to the one direction is preferably 3 or more. Further, from the viewpoint of the stability of manufacturing and quality, the draw ratio of the stretched layer in a direction perpendicular to the one direction (in particular, a machine direction (MD)) is preferably 10 or less, and may be 6 or less, or may be 4 or less.

<<Thickness>>

The thickness of the in-mold label is preferably 50 μm or more, more preferably 60 μm or more, further more preferably 70 μm or more, further more preferably 80 μm or more, and particularly preferably 90 μm or more, from the viewpoint of improving the tensile strength. From the viewpoint of following the container to reduce wrinkles and the like, and reducing partial thinning of the container due to embedment of the label, the thickness of the in-mold label is preferably 300 μm or less, more preferably 250 μm or less, and further more preferably 150 μm or less.

<Container Main Body>

The resin material that can be used for the neck portion and the body portion of the labeled container of the present invention is not limited, and examples thereof include a thermoplastic resin such as a polyester-based resin, a polyolefin-based resin or a polystyrene-based resin. The present invention is particularly applicable when the resin material is a polyester-based resin.

Examples of the polyester-based resin include polyethylene terephthalate (PET), polybutylene terephthalate, polybutylene succinate, and polylactic acid.

Examples of the polyolefin-based resin include a polypropylene-based resin, and a polyethylene-based resin.

EXAMPLES

Hereinafter, the present invention will be described in more detail by giving Examples, which should not be construed as limiting the present invention. Note that "part(s)", "%" and the like described in Examples indicate that they are described on a mass basis unless otherwise specified.

(Manufacturing of In-Mold Label)

Table 1 shows a list of materials used for in-mold labels.

TABLE 1

| | Material | Symbol | Description |
|---|---|---|---|
| Substrate layer | Thermoplastic resin | PP | Propylene homopolymer (trade name: NOVATEC PP MA4, manufactured by Japan Polypropylene Corporation, MFR (230° C., load: 2.16 kg): 5 g/10 min, melting point: 167° C.) |
| | | PE | High-density polyethylene (trade name: NOVATEC HD HJ490, manufactured by Japan Polyethylene Corporation, MFR: 20 g/10 min (190° C., load: 2.16 kg), melting point: 133° C.) |
| | Filler | CA | Heavy calcium carbonate particles (trade name: SOFTON 1800, manufactured by Bihoku Funka Kogyo Co., Ltd., average particle size: 1.8 μm) |
| Heat sealing layer | Thermoplastic resin | EVA | Ethylene-vinyl acetate copolymer (manufactured by Toyo-Morton Ltd., product name: AD1790-15, solid content: 15 mass %) |

(In-Mold Label (L1))

A resin composition for formation of a substrate layer was prepared by mixing 60 mass % of a propylene homopolymer (manufactured by Japan Polypropylene Corporation, product name: NOVATEC PP MA4, MFR (230° C., load: 2.16 kg): 5 g/10 min, melting point: 167° C.), 10 mass % of high-density polyethylene (NOVATEC HD HJ490, manufactured by Japan Polyethylene Corporation, MFR (190° C., load: 2.16 kg): 20 g/10 min, melting point: 133° C.), and 30 mass % of heavy calcium carbonate (manufactured by Bihoku Funka Kogyo Co., Ltd., product name: SOFTON 1800, average particle size: 1.8 μm).

The resin composition was melted and kneaded in an extruder heated to 230° C., and was extruded in a sheet shape, and cooled to obtain an non-stretched sheet.

The non-stretched sheet was heated to 150° C., and stretched at a ratio of 5 times in a machine direction (MD). Subsequently, the sheet was cooled to 60° C., heated to 150° C. again, and then stretched at a ratio of 8 times in a transverse direction (TD) using a tenter. The sheet was annealed at 160° C., and cooled at 60° C. to obtain a substrate layer sheet as an opaque white biaxially stretched film.

An ethylene-vinyl acetate copolymer (manufactured by Toyo-Morton Ltd., product name: ADCOAT AD1790-15, main component: ethylene-vinyl acetate-based copolymer (EVA), solid content: 15 mass %) was applied onto one surface of the substrate layer sheet by gravure coating to obtain an in-mold label (L1) in which a heat sealing layer was stacked on a substrate layer. In the in-mold label, the thickness of the substrate layer was 105 μm, and the thickness of the heat sealing layer was 3 μm.

(In-Mold Labels (L2) to (L5) and (L7)) In-mold labels (L2) to (L5) and (L7) were manufactured in the same manner as in the case of the in-mold label (L1) except that the composition or the thickness of the substrate layer or the method for formation thereof was changed as shown in Table 2.

(In-Mold Label (L6))

A heat sealing layer was formed on one surface of natural wood pulp paper in the same manner as in the case of the in-mold label (L1) to obtain an in-mold label (L6).

<Measurement of Tensile Strength>

The tensile strength of each of the in-mold labels (L1) to (L7) in each of the machine direction and the transverse direction was measured according to JIS K 7113.

Table 2 shows a list of the in-mold labels (L1) to (L7).

TABLE 2

| In-mold label | | L1 | L2 | L3 | L4 | L5 | L6 | L7 |
|---|---|---|---|---|---|---|---|---|
| Substrate layer | Composition | PP 60%<br>PE 10%<br>CA 30% | PP 60%<br>PE 10%<br>CA 30% | PP 60%<br>PE 10%<br>CA 30% | PP 60%<br>PE 10%<br>CA 30% | PP 100% | natural wood pulp paper | PP 100% |
| | Thickness [μm] | 105 | 80 | 130 | 250 | 75 | 100 | 80 |

TABLE 2-continued

| In-mold label | | L1 | L2 | L3 | L4 | L5 | L6 | L7 |
|---|---|---|---|---|---|---|---|---|
| Heat sealing layer | Composition | Main component: EVA | Main component: EVA | Main component: EVA | Main component: EVA | Main component: EVA | Main component: EVA | Main component: EVA |
| | Thickness [μm] | 3 | 3 | 3 | 3 | 3 | 3 | 3 |
| Molding method | Substrate layer | Sequential biaxial stretching method | Sequential biaxial stretching method | Sequential biaxial stretching method | Sequential biaxial stretching method | Sequential biaxial stretching method | — | Non-stretched |
| | Heat sealing layer | Gravure coating | Gravure coating | Gravure coating | Gravure coating | Gravure coating | Gravure coating | Gravure coating |
| Tensile strength [kN/m] | MD | 5.6 | 4.5 | 7.35 | 10.3 | 6.1 | 12.4 | 3.8 |
| | TD | 12.4 | 10.5 | 18.6 | 33.4 | 20.2 | 29.7 | 2.7 |

Example 1

The in-mold label (L1) was charged using an electrostatic charge apparatus, and then fixed to an inner wall surface of a mold of a stretch blow molding machine (manufactured by NISSEI ASB MACHINE CO., LTD., apparatus name: ASB-70DPH), and the mold was closed. As the mold, a mold for formation of a container of α type was used. The orientation of the in-mold label (L1) was adjusted so that the machine direction (MD) of the in-mold label (L1) coincides with the horizontal direction when the long side direction of the bottom surface of the mold was considered as the horizontal direction. Fixation by suction was performed so as to bring the substrate layer of the in-mold label (L1) into contact with the cavity of the mold. Thereafter, the temperature of the mold was controlled by circulating water so that the temperature of a surface of the mold on the cavity side was 45° C.

On the other hand, a bottomed cylinder-shaped preform made of a polyethylene terephthalate (PET) resin (manufactured by Mitsubishi Chemical Corporation, NOVAPEX BK-2180, glass transition temperature: 74.9° C., melting point: 247° C., intrinsic viscosity: 0.7 dl/g) was formed by the stretch blow molding machine, and the preform was heated to and held at 107° C. The heated preform was guided and inserted into the mold, and a blow pressure of 2 MPa was applied for 6 seconds while the preform was stretched in a perpendicular direction with a rod inserted into the hollow of the preform. In this way, blow molding was performed. The lag time until the start of blowing after the start of stretching with the rod was 0.2 seconds, and the blowing was started before the length of the inserted portion of the rod reached ½ of the size of the cavity of the mold in the perpendicular direction (Dz). The mold was cooled to 50° C. over 15 seconds, and then opened to obtain a labeled container.

Examples 2 and 3

Except that the in-mold label (L1) was changed to the in-mold label (L2), and the blow pressure was changed as shown in Table 3, the same procedure as in Example 1 was carried out to obtain labeled containers of Examples 2 and 3.

Examples 4 to 9

Except that the in-mold label, the blow pressure or the temperature of the preform were changed as shown in Table 3, the same procedure as in Example 1 was carried out to obtain labeled containers of Examples 4 to 9.

Example 10

Except that a mold for formation of the β type was used, the transverse direction (TD) of the in-mold label was made to coincide with the horizontal direction, and blowing was started after the length of the inserted portion of the rod exceeded ½ of the size of the container in the perpendicular direction (Dz), the same procedure as in Example 5 was carried out to obtain a labeled container of Example 10.

Examples 11 to 13

Except that the in-mold label or the length of the inserted portion of the rod at the start of blowing was changed as shown in Table 4, the same procedure as in Example 10 was carried out to obtain labeled containers of Examples 11 to 13.

Example 14

Except that a mold and a reform for formation of the γ type was used, the transverse direction (TD) of the in-mold label was made to coincide with the horizontal direction, and the lag time until the start of blowing after the start of stretching with the rod was changed as shown in Table 4, the same procedure as in Example 1 was carried out to obtain a labeled container of Example 14.

Examples 15 and 16

Except that the in-mold label or the temperature of the preform was changed as shown in Table 4, the same procedure as in Example 14 was carried out to obtain labeled containers of Examples 15 and 16.

Comparative Example 1

Except that the transverse direction (TD) of the in-mold label was made to coincide with the horizontal direction, and the length of the inserted portion of the rod at the start of blowing was changed as shown in Table 4, the same procedure as in Example 5 was carried out to obtain a labeled container of Comparative Example 1.

Comparative Example 2

Except that the in-mold label (L1) was changed to the in-mold label (L7), and the orientation of the in-mold label (L7) was adjusted so that the transverse direction (TD) coincided with the horizontal direction, the same procedure as in Comparative Example 1 was carried out to obtain a labeled container of Comparative Example 2.

Comparative Example 3

Except that the machine direction (MD) of the in-mold label was made to coincide with the horizontal direction, the same procedure as in Example 11 was carried out to obtain a labeled container of Comparative Example 3.

(Measurement and Evaluation)

For the labeled containers, measurement and evaluation were performed as described below.

<Draw Ratio of Labeled Container>

The body portion of the preform was marked with two lines so as to give equal intervals in each of the horizontal direction, the depth direction and the perpendicular direction. In the preform and the labeled container formed from the preform, the size between the lines in each direction was measured with a scale. Ratios of the sizes measured in the labeled container to the sizes measured in the preform were determined as draw ratios of the body portion in the horizontal direction, the depth direction and the perpendicular direction, (Dx/dx), (Dy/dy) and (Dz/dz), respectively.

<Draw Ratio of Labeled Container (Horizontal Direction)>

A ratio of the size of the body portion to the size of the neck portion in the horizontal direction (Dx/ndx) in the labeled container was determined as a ratio of the size of the labeled container to the size of the preform in the horizontal direction (Dx/dx). This size ratio (Dx/dx) also represents a draw ratio of the body portion in the horizontal direction.

<Draw Ratio of Labeled Container (Depth Direction)>

A ratio of the size of the body portion to the size of the neck portion in the depth direction in the labeled container (Dy/ndy) was determined as a ratio of the size of the labeled container to the size of the preform in the depth direction (Dy/dy). This size ratio (Dy/dy) also represents a draw ratio of the body portion in the depth direction.

<Oblateness of Labeled Container>

A ratio of the size in the horizontal direction to the size in the depth direction (Dx/Dy) in the labeled container was determined as an oblateness. The oblateness is 1 when the bottom surface of the labeled container has a square shape. The oblateness exceeds 1 when the labeled container is flat.

From the size in the horizontal direction, Dx and the size in the depth direction, Dy in the body portion of the labeled container and the size in the horizontal direction, dx and the size in the depth direction, dy in the body portion of the preform, (Dx×dy)/(Dy×dx) was determined.

<Elongation Ratio of Label>

In each of the horizontal direction and the depth direction, a ratio of the size of the label of the labeled container after blow molding to the size of the in-mold label before blow molding was determined as an elongation ratio (%).

<Wrinkles>

The level of wrinkles on the surface of the label of the labeled container was visually determined on the basis of the following evaluation criteria.

Not wrinkled: as free of wrinkles as the label before molding.

Slightly wrinkled: there are minor wrinkles, which are not noticeable and are within an allowance.

Wrinkled: there are major wrinkles or many wrinkles, so that the label is of no practical use.

<Breakage>

Whether or not there was breakage in the label of the labeled container was visually determined.

<Distortion of Printed Contents>

The level of the state of distortion of printed characters on the surface of the label of the labeled container is visually determined on the basis of the following evaluation criteria.

No distortion: as free of distortion as the printed characters before molding.

Minor distortion: characters are slightly distorted, but there is no problem in practical use.

Moderate distortion: characters are distorted, but are within an allowable.

Major distortion: characters are distorted, and contents are obscured, so that the label is of no practical use.

Tables 3 and 4 show measurement results and evaluation results.

TABLE 3

| | | Example 1 | Example 2 | Example 3 | Example 4 | Example 5 | Example 6 | Example 7 | Example 8 | Example 9 |
|---|---|---|---|---|---|---|---|---|---|---|
| Container type | | α | α | α | α | α | α | α | α | α |
| Draw ratio | Perpendicular direction (Dz/dz) | 1.5 | 1.5 | 1.5 | 1.9 | 1.9 | 1.9 | 1.9 | 1.9 | 1.9 |
| | Depth direction (Dy/dy) | 1.2 | 1.2 | 1.2 | 1.2 | 1.2 | 1.2 | 1.2 | 1.2 | 1.2 |
| | Horizontal direction (Dx/dx) | 4.1 | 4.1 | 4.1 | 4.1 | 4.1 | 4.1 | 4.1 | 4.1 | 4.1 |
| Oblateness (Dx/Dy) | | 1.8 | 1.8 | 1.8 | 1.8 | 1.8 | 1.8 | 1.8 | 1.8 | 1.8 |
| (Dx × dy)/(Dy × dx) | | 3.42 | 3.42 | 3.42 | 3.42 | 3.42 | 3.42 | 3.42 | 3.42 | 3.42 |
| Blow pressure [MPa] | | 2 | 2.5 | 2.5 | 2.5 | 2.5 | 2.5 | 2.5 | 2.5 | 2.5 |
| Blow time [sec] | | 6 | 6 | 6 | 6 | 6 | 6 | 6 | 6 | 6 |
| Preform temperature [° C.] | | 107 | 107 | 107 | 97 | 97 | 97 | 97 | 97 | 97 |
| Lag time until start of blowing after start of rod stretching [sec] | | 0.2 | 0.2 | 0.2 | 0.2 | 0.2 | 0.2 | 0.2 | 0.2 | 0.2 |
| Length of inserted portion of rod at start of blowing | | 0~1/2Dz | 0~1/2Dz | 0~1/2Dz | 0~1/2Dz | 0~1/2Dz | 0~1/2Dz | 0~1/2Dz | 0~1/2Dz | 0~1/2Dz |
| In-mold label | | L1 | L1 | L2 | L2 | L1 | L3 | L4 | L5 | L6 |

TABLE 3-continued

| | | Example 1 | Example 2 | Example 3 | Example 4 | Example 5 | Example 6 | Example 7 | Example 8 | Example 9 |
|---|---|---|---|---|---|---|---|---|---|---|
| Tensile strength [kN/m] | MD | 5.6 | 5.6 | 4.5 | 4.5 | 5.6 | 7.35 | 10.3 | 6.1 | 12.4 |
| | TD | 12.4 | 12.4 | 10.5 | 10.5 | 12.4 | 18.6 | 33.4 | 20.2 | 29.7 |
| Label direction | Perpendicular direction z | MD | MD | MD | MD | MD | MD | MD | MD | MD |
| | Horizontal direction x | TD | TD | TD | TD | TD | TD | TD | TD | TD |
| Elongation ratio of label [%] | Perpendicular direction z | 0 | 0 | 0 | 0 | 0.2 | 0.1 | 0 | 0.2 | 0 |
| | Horizontal direction x | 0.2 | 0.6 | 2.3 | 4.1 | 2.2 | 1.9 | 0.0 | 0.5 | 0.0 |
| Wrinkle | | None | None | None | Slightly wrinkled | None | None | None | None | None |
| Breakage | | None | None | None | None | None | None | None | None | None |
| Distortion of printed characters | | None | None | Minor distortion | Moderate distortion | Minor distortion | None | None | None | None |

TABLE 4

| | | Example 10 | Example 11 | Example 12 | Example 13 | Example 14 | Example 15 | Example 16 | Comparative Example 1 | Comparative Example 2 | Comparative Example 3 |
|---|---|---|---|---|---|---|---|---|---|---|---|
| Container type | | β | β | β | β | γ | γ | γ | α | α | β |
| Draw ratio | Perpendicular direction (Dz/dz) | 3.2 | 3.2 | 4 | 4 | 2.2 | 2.2 | 3.1 | 1.5 | 1.5 | 3.2 |
| | Depth direction (Dy/dy) | 1.5 | 1.5 | 1.5 | 1.5 | 1.2 | 1.2 | 1.2 | 1.2 | 1.2 | 1.5 |
| | Horizontal direction (Dx/dx) | 1.8 | 1.8 | 1.8 | 1.8 | 1.8 | 1.8 | 1.8 | 4.1 | 4.1 | 1.8 |
| Oblateness (Dx/Dy) | | 1.3 | 1.3 | 1.3 | 1.3 | 1.9 | 1.9 | 1.9 | 1.8 | 1.8 | 1.3 |
| (Dx × dy)/(Dy × dx) | | 1.20 | 1.20 | 1.20 | 1.20 | 1.50 | 1.50 | 1.50 | 3.42 | 3.42 | 1.20 |
| Blow pressure [MPa] | | 2.5 | 2.5 | 2.5 | 2.5 | 3.2 | 3.2 | 3.2 | 2.5 | 2.5 | 2.5 |
| Blow time [sec] | | 6 | 6 | 6 | 6 | 6 | 6 | 6 | 6 | 6 | 6 |
| Preform temperature [° C.] | | 97 | 97 | 97 | 97 | 107 | 107 | 97 | 97 | 97 | 97 |
| Lag time until start of blowing after start of rod stretching [sec] | | 0.2 | 0.2 | 0.2 | 0.2 | 1 | 1 | 1 | 0.2 | 0.2 | 0.2 |
| Length of inserted portion of rod at start of blowing | | More than 1/20z | More than 1/20z | 0~1/2Dz | 0~1/2Dz | 0~1/2Dz | 0~1/2Dz | 0~1/2Dz | More than 1/20z | More than 1/20z | More than 1/20z |
| In-mold label | | L1 | L2 | L1 | L2 | L1 | L2 | L1 | L1 | L7 | L2 |
| Tensile strength [kN/m] | MD | 5.6 | 4.5 | 5.6 | 4.5 | 5.6 | 4.5 | 5.6 | 5.6 | 3.8 | 4.5 |
| | TD | 12.4 | 10.5 | 12.4 | 10.5 | 12.4 | 10.5 | 12.4 | 12.4 | 2.7 | 10.5 |
| Label direction | Perpendicular direction z | TD | TD | TD | TD | TD | TD | TD | TD | TD | MD |
| | Horizontal direction x | MD | MD | MD | MD | MD | MD | MD | MD | MD | TD |
| Elongation ratio of label [%] | Perpendicular direction z | 0.2 | 2.0 | 1.0 | 4 | 0 | 1.0 | 1.0 | 0 | 0 | 6 |
| | Horizontal direction x | 0.0 | 0.0 | 0.0 | 0.0 | 0.0 | 0.2 | 0.3 | 10.7 | 13.1 | 0.0 |
| Wrinkle | | None | None | None | None | None | None | None | Wrinkled | Wrinkled | Wrinkled |
| Breakage | | None | None | None | None | None | None | None | None | Breakage observed | None |
| Distortion of printed characters | | None | Minor distortion | None | Moderate distortion | None | None | None | Major distortion | Major distortion | Major distortion |

As shown in Tables 3 and 4, printed characters are not significantly distorted, and deformation of the appearance of the label can be reduced in all of Examples 1 to 16 where one direction in which the tensile strength is 10 kN/m or more was made to coincide with the horizontal direction or the perpendicular direction by adjusting the orientation of the in-mold label by step (a) in the case of the labeled container of α type and by step (b) in the case of the labeled containers of β and γ types.

On the other hand, in Comparative Examples 1 to 3, the orientation of the in-mold label is not adjusted so that one direction in which the tensile strength is 10 kN/m or more coincides with the horizontal direction or the perpendicular direction. Thus, the elongation ratio of the label in the horizontal direction or the perpendicular direction is about 2 times or more of that in each of Examples, and printed characters are significantly distorted. Stress applied from the preform during molding cannot be resisted, and wrinkles are generated or breakage occurs.

All of Examples 1 to 16 are well acceptable as products. Just for reference, Example 3, in which the in-mold label (L2) is used instead of the in-mold label (L1) under the molding conditions of Example 2, thus has slightly lower tensile strength and a slightly higher label elongation ratio as compared to Example 2. Example 4, in which stretch blowing is performed on a hard preform with the preform set at a lower temperature as compared to Example 3, thus has a label elongation ratio of 4%. Thus, evaluation results for wrinkles or printed character distortion after formation of the container are improved in Example 2 as compared to those in Example 3 and in Example 3 as compared to those in Example 4.

In Example 8, the in-mold label (L5) is used instead of the in-mold label (L2) under the molding conditions of Example 4. The in-mold label (L5), which contains a large amount of resin, thus has high tensile strength, ensures a low label elongation ratio, and does not cause wrinkles. Example 10 involves a labeled container of β type in which the in-mold label (L1) is easily elongated in the machine direction, and molding optimum conditions for the β type. Since blowing is performed after the stretching rod is deeply inserted, the label elongation ratio can be suppressed. All of Examples are well acceptable as products because printed characters are not significantly distorted, and deformation of the appearance of the label can be reduced.

The present application claims priority based on Japanese Patent Application No. 2022-057046 which is a Japanese patent application filed on Mar. 30, 2022, disclosure of which is incorporated in its entirety.

REFERENCE SIGNS LIST

10 Preform
11 Neck portion
12 Body portion
20 In-mold label
30 Labeled container
31 Neck portion
32 Body portion
50 to 52 Mold
55 Rod

The invention claimed is:

1. A method for manufacturing a labeled container, comprising:
- disposing an in-mold label on an inner wall surface of a mold;
- preparing a heated preform having an inner hollow;
- inserting the preform into the mold; and
- blow molding by blowing a gas into the hollow of the preform, and thus expanding the preform to form a labeled container to which the in-mold label is attached, wherein:
- the preform has:
  - a dimension dx in a horizontal direction x,
  - a dimension dy in a depth direction y, and
  - a dimension dz in a perpendicular direction z;
- the labeled container has:
  - a dimension Dx in the horizontal direction x,
  - a dimension Dy in the depth direction y, and
  - a dimension Dz in the perpendicular direction z;
- the horizontal direction x, the depth direction y, and the perpendicular direction z orthogonally cross one another;
- a bottom surface of the preform inside the mold is disposed on a plane formed by the horizontal direction x and the depth direction y;
- a bottom surface of the labeled container inside the mold is disposed on a plane formed by the horizontal direction x and the depth direction y;
- at least a part of the in-mold label is disposed on the labeled container on a plane formed by the horizontal direction x and the perpendicular direction z;
- the in-mold label has a tensile strength of 10 kN/m or more in one direction, and
- the disposing the in-mold label on the inner wall surface of the mold includes the following (a) or (b) of adjusting an orientation of the in-mold label:
- (a) making the one direction of the in-mold label substantially coincide with the horizontal direction x when:
  - Dx is 2 times or more larger than dx,
  - Dy is 1 time or more and less than 2 times larger than dy, and $$1 \leq Dz/dz < 1.5;\text{ or}$$

- (b) making the one direction of the in-mold label substantially coincide with the perpendicular direction z when:
  - Dx is 1 time or more and less than 2 times larger than dx,
  - Dy is 1 time or more and less than 2 times larger than dy, and $$1.5 \leq Dz/dz.$$

2. The method for manufacturing a labeled container according to claim 1, wherein the in-mold label has a tensile strength of 12 kN/m or more in the one direction.

3. The method for manufacturing a labeled container according to claim 1, wherein a temperature of the heated preform is 105° C. or higher.

4. The method for manufacturing a labeled container according to claim 1, wherein a pressure of the gas blown in the blow molding is 3.5 MPa or less.

5. The method for manufacturing a labeled container according to claim 1, wherein the orientation of the in-mold label is adjusted by (b), a rod is inserted into the hollow of the preform in the blow molding, and the blowing of the gas is started after a length of an inserted portion of the rod exceeds ½ of the size of the labeled container in the perpendicular direction when the preform is stretched in a perpendicular direction by the rod.

6. The method for manufacturing a labeled container according to claim 1, wherein the in-mold label includes a stretched layer.

7. The method for manufacturing a labeled container according to claim 1, wherein the in-mold label has a thickness of 50 to 300 μm.

8. The method for manufacturing a labeled container according to claim 1, wherein the preform is a bottomed cylinder-shaped molded product.

9. The method for manufacturing a labeled container according to claim 1, wherein the disposing the in-mold label on the inner wall surface of the mold includes (a) of adjusting the orientation of the in-mold label.

* * * * *